United States Patent [19]
Conoby et al.

[11] Patent Number: 5,516,423
[45] Date of Patent: May 14, 1996

[54] VARIABLE RESIDENCE TIME TREATMENT SYSTEM

[75] Inventors: Mark J. Conoby, Acton; James F. Conoby, Boxboro, both of Mass.

[73] Assignee: Concorp, Inc., Concord, Mass.

[21] Appl. No.: 287,517

[22] Filed: Aug. 8, 1994

[51] Int. Cl.$^6$ .......................... B01D 17/12; B01F 15/02; B01F 15/04
[52] U.S. Cl. .............. 210/85; 137/93; 137/391; 210/96.1; 210/103; 210/194; 210/205; 210/248; 366/134; 366/136; 422/105; 422/111
[58] Field of Search ............................ 137/93, 389, 391, 137/393, 590.5; 210/85, 86, 87, 96.1, 103, 104, 143, 202, 205, 219, 248, 194, 743, 744, 257.1, 195.1, 258, 259, 614; 422/62, 110, 111, 105, 107, 114; 366/132, 134, 136, 142, 184

[56] References Cited

U.S. PATENT DOCUMENTS 4,435,291  3/1984  Matsko ........................ 210/743
4,823,987  4/1989  Switall ........................ 366/132

FOREIGN PATENT DOCUMENTS 2438279  2/1976  Germany ........................ 210/743
4-11991  1/1992  Japan ........................ 210/219
4-83591  3/1992  Japan ........................ 210/219
633587  11/1978  U.S.S.R. ........................ 422/62

Primary Examiner—Joseph W. Drodge
Attorney, Agent, or Firm—Banner & Allegretti, Ltd.

[57] ABSTRACT

A variable residence time treatment system for liquid has a reactor vessel with variable effective holding volume. Liquid is admitted with at least one treatment material to adjust a property of the liquid, such as its pH, a discharge outlet is open full time during operation of the system to pass discharge flow from the reactor tank at its full holding volume. Treated liquid can be selectively discharged when the reactor vessel is less than full. Thus, the effective resident time of liquid in the reactor vessel is controlled by controlling the effective holding volume of the reactor tank in response to a holding volume control signal. A sensor monitors a property of the liquid and generates a corresponding input signal. A controller generates the control signal in response to the input signal.

13 Claims, 2 Drawing Sheets

VARIABLE RESIDENCE TIME TREATMENT SYSTEM

INTRODUCTION

The present invention is directed to a variable residence time treatment system for treating liquid. More particularly, the invention is directed to a system for receiving, treating and discharging a stream of liquid which may have variable flow rate, concentration and/or composition, exceeding from time to time the maximum steady state capacity of the system.

BACKGROUND OF THE INVENTION

Known systems for treatment of liquids, such as aqueous waste effluent from laboratory and industrial facilities, e.g., chemistry laboratories, hospitals, biotechnology research laboratories, industrial processes and the like, must handle incoming wastewater streams which vary over time both in flow rate and in composition. The composition may vary either as to the chemical constituents in the wastewater, the concentration of constituents or both. The liquid which must be treated from facilities dealing with chemical and/or biological materials frequently is intermittently quite acidic or alkaline. Such treatment systems typically employ a batch reactor or a continuous stirred tank reactor (CSTR). In a batch reactor, a liquid is accumulated in one of two or more treatment tanks or in a temporary holding tank. The liquid is treated in the batch reactor until expiration of a preset time limit or attainment of preset conditions triggers discharge. Such discharge may be either to another treatment stage or final discharge to storage, a sewer or other final destination. Batch reactor systems are disadvantaged in that they typically require greater holding volume than do CSTR systems. At least two tanks are required, one for treating a first batch of wastewater while a holding tank or a second treatment tank is receiving a second treatment batch. A batch system generally is more expensive for a given treatment capacity in view of the need for holding tanks and/or multiple reactor tanks. In certain installations, particularly where existing facilities are being retro-fitted with a liquid treatment system, available space may not accommodate multiple reactor tanks.

In a CSTR system, a reactor tank is continuously open to accept an incoming flow of the liquid. A CSTR reactor also is adapted typically for continuous discharge of treated liquid. In fact, for certain applications, such as treatment of aqueous waste effluent from a hospital, laboratory, biotechnology research or production facility, etc., such treatment systems frequently are required to have a discharge outlet which is open full time during operation of the system.

CSTR systems are advantageous in that wastewater or other liquid is continuously treated and discharged. CSTR systems are for this reason particularly suitable for treatment of variable flow liquid in situations in which applicable regulations prohibit closing the flow of liquid into or out of the treatment system. CSTR systems are disadvantaged, however, in that a sudden spike in the flow rate of the in-flowing liquid will reduce the average or effective residence time of the liquid in the treatment tank, possibly causing the discharge flow from the reactor tank to exceed process or regulatory limits for a given characteristic or property, such as pH, oxidation reduction potential ("ORP"), dissolved oxygen ("DO"), etc. Similarly, a sudden increase in concentration may result in the effective residence time being insufficient to adequately treat the liquid, given the treatment system's capacity.

Those who are skilled in this area of technology will recognize that in a typical CSTR system, the effective residence time or the average or mean residence time of the liquid in the reactor tank is a function of the holding volume of the tank and of the rate of influx of liquid. The discharge flow from the CSTR reactor tank is a stirred mixture of old and new liquid (plus any added treatment materials) which, at any point in time, has an average bulk property which should meet process or regulatory requirements. Thus, the holding volume of the tank contains a body of liquid undergoing treatment. A given CSTR treatment system, faced with a sudden increase in influx rate (e.g., above its rated steady state capacity and/or concentration), may simply be unable to feed reagent (for example, an acid or alkali reagent for bringing the pH of influx wastewater to within a prescribed range set by applicable regulations or control limits) at a sufficiently high feed rate, given the system's maximum pumping rate for the reagent and the effective residence time of the system at that influx rate, for adequate treatment. Thus, for a time following such sudden influx, the discharge stream from the reactor tank may fail to comply with applicable regulatory or process control limits. In certain instances, such lack of compliance may comprise a civil or criminal violation and may result in imposition of a fine or other sanction.

It is known to use multiple stage CSTR reactor tanks to deal with the problem of variable influx streams, wherein the volume and/or concentration of the stream may periodically exceed, for short periods, the treatment capacity of the first CSTR reactor tank. As discussed above, however, the use of multiple reactor tanks can significantly increase both the cost and the space requirements of the system, often negating the benefits of such CSTR system over a comparable batch treatment system. A desirable treatment system for liquid, such as aqueous waste effluent mentioned above, having a full-time open discharge during operation, would include the space and cost benefits of a CSTR system with the capacity of a batch treatment system for handling variable concentration and flow rates. It is an object of the present invention to provide a CSTR system which meets this need. Additional objects and advantages of various embodiments of the invention will be apparent from the following disclosure.

SUMMARY OF THE INVENTION

In accordance with one aspect of the invention, a variable residence time CSTR treatment system is provided for receiving, treating and discharging a variable flow of liquid, such as aqueous waste effluent. Although the flow is received by the treatment system, it is referred to herein occasionally as "effluent," since typically it is flowing as effluent from a previous, i.e., upstream processing step or other source. The system comprises a reactor tank or other containment means having a variable effective holding volume for treatment of the liquid. The system is able to adjust the mean residence time and the residence time distribution in response to process conditions and control parameters including, for example, inlet concentration, inlet flow rate, composition, concentration (pH, ORP, DO etc.) of liquid in the reactor tank, volume of liquid (plus treatment reagents, etc.) in the reactor tank, discharge concentration and/or discharge flow rate. A controller actuates reagent feed pumps or the like and means for varying the effective holding volume of the reactor tank, preferably making on-going real-time adjustments in such treatment process variables, in response to input signals from sensors monitoring some or all of the aforesaid process conditions and parameters to maintain discharge composition, concentration and/or flow rate within preselected ranges.

As now described, the variable effective holding volume of the CSTR system of this invention provides means for, in effect, increasing the capacity of the system, for a certain length of time, above its maximum steady state capacity. The variable effective holding volume enables the system to periodically increase effective residence time in the reactor tank to handle periodic spikes in the concentration and/or flow rate of the in-flowing liquid. The reactor tank comprises an inlet for admitting the liquid and for admitting at least one treatment material or reagent to adjust its chemical composition (e.g., pH, ORP or DO) or other measurable property of the liquid. The reactor tank further comprises a discharge means for passing a discharge flow of treated liquid to a subsequent treatment stage or disposal. The discharge means comprises a discharge outlet which is open full time during operation of the system to pass such discharge flow from the reactor tank at its maximum full holding volume. Those skilled in this area of technology will recognize that reference herein to such discharge outlet being open full time during operation of the system is intended to mean that it is open to permit discharge of treated liquid, such as wastewater, during normal operating conditions, and not necessarily during the installation or removal of the system, during a testing operation or the like.

The discharge means further comprises variable residence time means for controlling the effective holding volume of the reactor tank by passing the discharge flow of treated liquid from the reactor tank at an effective holding volume which is less than its maximum full holding volume. Preferably, the variable residence time means is responsive to a holding volume control signal from a controller which generates such holding volume control signal based, at least in part, on input control signals corresponding to the volume, composition and/or concentration of the in-flowing stream. Thus, in the event of a sudden increase in the volume and/or concentration of the liquid stream, the variable residence time means increases the effective holding volume of the reactor tank to increase the effective residence time of the liquid in the reactor tank. The effective holding volume of the reactor tank can be increased to its maximum full holding volume, at which point a discharge flow will commence from the aforesaid full-time open discharge outlet.

Increasing the effective holding volume of the reactor tank in this way is equivalent to temporarily increasing the capacity of the treatment system. The difference between the minimum effective holding volume, at which the reactor tank preferably is normally held by the variable residence time means, and the maximum full holding volume of the tank represents reserve system capacity. Since, in many installations, a sudden increase in the concentration or the flow rate of the in-coming liquid stream will occur only periodically and/or intermittantly, such reserve capacity will enable the system to maintain the discharge flow within regulatory or process control limits in at least certain instances when it would otherwise have exceeded such limits. In the interim periods between sudden flow rate or concentration spikes, the variable residence time means returns the effective holding volume of the reactor tank to a pre-set or minimum effective holding volume in preparation for accommodating a subsequent spike of substantial variation in the in-coming liquid flow rate, composition or concentration.

The variable residence time treatment system generally will further comprise means for feeding treatment or reactant materials to the reactor tank, typically comprising one or more reagent feed systems responsive to a process feed control signal from the controller. Such feed control signal can be generated by the controller based at least in part on the aforesaid inlet stream sensors, sensors exposed to liquid being treated in the reactor tank or being discharged, or any combination of these. Those skilled in this area of technology will recognize that the nature and the number of treatment reagents needed depends on the composition of the liquid and on the properties for which it is being treated.

As indicated above, the present invention represents a significant advance in the technology of liquid reaction handling, especially aqueous waste effluent treatment. In accordance with the invention, a single-tank CSTR system can be used with its attendant cost and space savings, for treating a liquid stream of variable volume, composition and/or concentration. Sudden increases in flow rate, composition and/or concentration can be better managed to maintain the discharge stream within process or regulatory control limits. The variable effective holding volume CSTR reactor tank of the invention also is applicable to multireactor tank systems, with corresponding advantages. These and other features and advantages will be apparent from the following more detailed discussion of certain preferred embodiments of the invention.

BRIEF DESCRIPTION OF THE DRAWINGS

The following detailed discussion will make reference to the two appended drawings. The same reference numbers are used in the two drawings to identify features or components common to both embodiments illustrated.

DETAILED DESCRIPTION OF CERTAIN PREFERRED EMBODIMENTS

Figure 1:
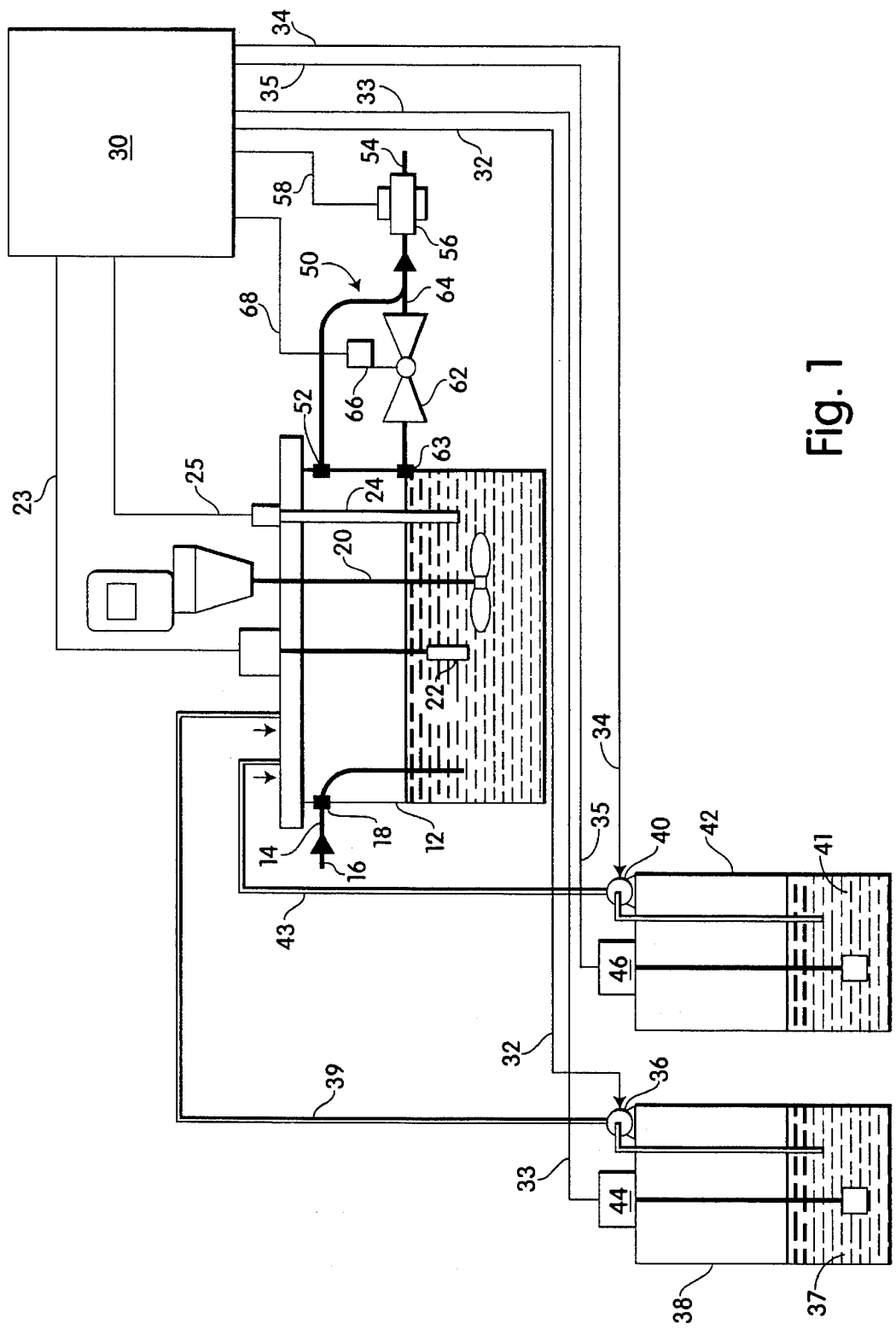
FIG. 1 is a schematic, partially cross-sectional illustration of a variable residence time treatment system in accordance with a first preferred embodiment of the invention.
Figure 2:
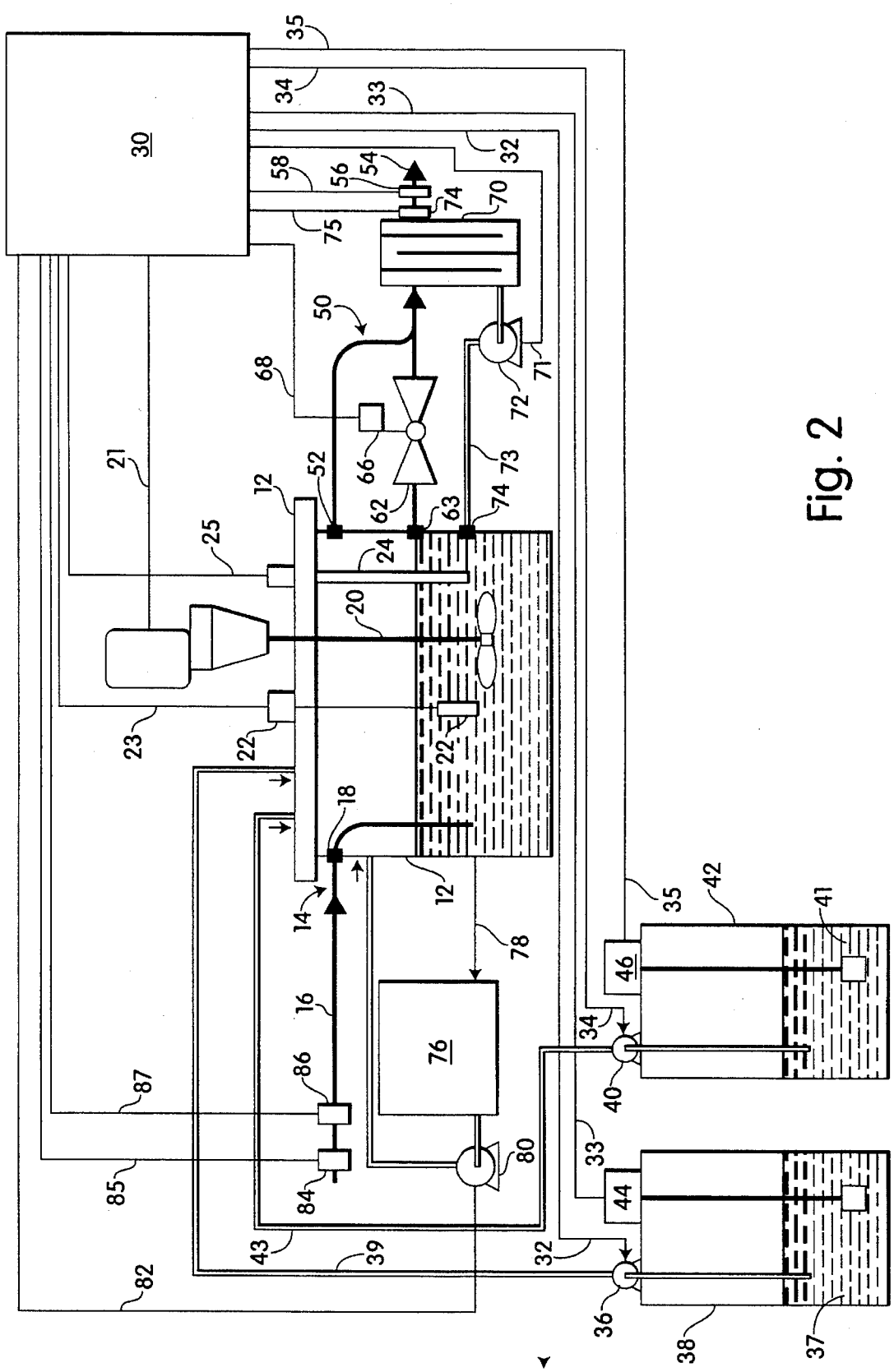
FIG. 2 is a schematic, partially cross-sectional illustration of a variable residence time treatment system in accordance with a second preferred embodiment of the invention.

In view of the present disclosure, those skilled in this area of technology will recognize that the variable residence time treatment system of the invention, including for example the embodiments illustrated in FIGS. 1 and 2, are suitable for treating a variety of liquid streams. The systems is readily adapted to treating liquid material streams, for example, from a hospital or chemical laboratory, biomedical research or industrial processing facility and the like, wherein the liquid stream will vary from time to time in flow rate, concentration and/or in composition. Reference herein to the composition of the liquid stream being variable is intended to mean that the chemical components of the stream vary from time to time and/or that the concentration of one or more components varies. It will be readily apparent that any number of reagents may be provided for treatment of the liquid stream within the reactor tank. For purposes of illustration, the treatment systems of FIGS. 1 and 2 each is shown with two treatment materials fed to the reactor tank from separate reagent storage tanks. Thus, the liquid stream may be treated to control a number of measurable properties including, for example, pH, DRP, DO or conductively, metal contaminants, biological components, etc. For ease of illustration, the discussion below will focus on the use of the variable residence time treatment systems of FIGS. 1 and 2 to control the pH of an aqueous waste effluent stream, wherein the first and second reagent storage tanks hold material for increasing and decreasing, respectively, the pH of the aqueous waste effluent.

The variable residence time treatment system of FIG. 1 is seen to have a containment means comprising a neutralization reactor tank 12 for treatment of liquid entering tank 12 via inlet means 14. Inlet means 14 comprises inlet pipe 16 which enters reactor tank 12 at inlet port 18. Reactor tank 12 typically may be cylindrical, and is equipped with a motor driven mixer 20. The system preferably is capable of variable mixing, including short blending or mixing at all volumes. Suitable construction material for various components of the system include, for example, various commercially available plastics and metal alloys, such as polypropylene for the reactor tank 12, and stainless steel for wetted components of the mixer 20, fittings and the like. Alternative suitable materials for these and other components of the system are commercially available and will be readily apparent to those who are skilled in this area of technology in view of the present disclosure.

Reactor tank 12 is equipped with a pH sensor 22, which is positioned sufficiently low in the tank to ensure exposure to the liquid being treated, even when the tank is at its minimum holding volume (discussed further below). The pH sensor 22 provides a pH signal 23 to control means 30. Tank 12 is also equipped with a level sensor 24 for sensing the level of liquid in the tank. Level sensor 24 provides a level signal 25 to control means 30, which is indicative of the liquid level in the tank.

Control means 30 preferably is a dedicated instrumentation and control system responsive to a number of input signals, including, but not necessarily being limited to, the aforesaid reactor tank pH signal 23 and level signal 25, for controlling the treatment process. In addition to controlling the effective residence time of the liquid in the reactor tank by varying the effective holding volume, the control means optionally may control mixing, flow baffling, volume detention, chemical feed addition, etc. Suitable control programs for operation a CSTR treatment system in accordance with this invention to minimize or eliminate discharges which exceed preset control limits will be apparent in view of the present disclosure to those who are skilled in this technology, and can be readily implemented in accordance with known techniques and using commercially available components. Control means 30 preferably comprises a process controller with full bi-directional, proportional, integral and derivative (PID) controller, and direct control outputs 32 and 34 to regulate reagent metering pumps 36 and 40, respectively. Optionally, however, a simple on/off control or other control scheme for reagent feed may be used. Control output 32 actuates the first metering pump 36 to feed a first reagent, e.g., acidifying agent 37, from a first reagent holding tank 38 to the reactor tank 12 via feed line to neutralize an alkaline liquid. Similarly, control output 34 actuates a second metering pump 40 to feed a second reagent, e.g., alkaline reagent 41 from a second reagent holding tank 42 to reactor tank 12 via second feed line 43 to neutralize an acidic liquid. The controller generates control outputs 32 and 34 in responsive to pH signal 23 and, optionally, other inputs, such as level signal 25 etc. A level sensor 44 in tank 38 sends a first level signal 33 to the controller 30 to actuate an indicator, such as a level gauge or a low level warning light, to alert an operator to a low level of reagent in tank 38. Similarly, level sensor 46 in reagent tank 42 sends a second level signal 35 to the controller 30 to actuate an indicator or the like.

Reagent pumps 36 and 40 preferably provide highly variable and controllable flow rates, for example 100:1 or greater turndown ratios, to allow precise and flexible response to liquid treatment conditions.

Controller 30 preferably has metering pump flow rate control circuits for each reagent metering pump. The metering pump flow rate control circuits would be responsive both to the PID controller and to other appropriate control signals. Also included preferably are alarm indicators, such as indicator lights or horn alarms, to indicate that the pH of the discharge stream is outside the specified range, being either too high or too low. Controller 30 further preferably comprises a chart recorder, or other recording means, to record and display the condition of the discharge from the reactor tank 12 and possibly the history of other operating conditions. Such display may show, for example, the pH of the discharge, its flow rate over time, the volume and pH of the incoming liquid, the amount of each reagent used and other conditions of interest to the system operator.

The CSTR system of FIG. 1 further comprises discharge means 50, which includes discharge outlet 52. Discharge outlet 52 in an outlet port to discharge line 54 and is open full time. It is located just below the vertical height of the inlet port 18, to prevent backflow of discharge into pipe 16. Treated liquid, upon filling the full holding volume of reactor tank 12, will discharge through outlet 52 by gravity. Outlet pH sensor 56 monitors the pH of the discharge flow and sends discharge pH signal 58 indicative of the discharge pH to controller 30 for recording etc, as discussed above. Suitable pH sensors and other sensors discussed in connection with the embodiments of FIGS. 1 and 2 are commercially available and are used in accordance with techniques well understood by those who are skilled in this area of technology. Immersion type pH electrode assemblies are preferred, with temperature compensation and two-wire transmitter means. Continuous level measurement to allow measurement at all points is preferred, but level switches are a suitable alternative.

The discharge means 50 of the CSTR system of FIG. 1, in accordance with a significant aspect of the invention, further comprises variable residence time means for controlling the effective holding volume of reactor tank 12. Specifically, adjustment valve 62 is provided to open, close or vary the discharge flow from tank 12 via discharge port 63 and discharge line 64. Discharge flow through line 64 enters the aforesaid discharge line 54 upstream of pH sensor 56. Valve 62 is controlled by valve motor 66 which is responsive to valve control signal 68 from controller 30. Valve 62 may be controlled either for open/close operation or for variable outlet flow rate control, depending largely on the sophistication of the controller and the needs of a particular application. It can be seen that discharge port 63 is lower than port 52. Thus, when valve 62 is opened, the level of liquid in reactor tank 12 is permitted to drop to the height of port 63. In the embodiment of FIG. 1, this represents the minimum holding volume of tank 12. By controlled opening and closing of valve 62 the effective holding volume of tank 12 can be set at any level between such minimum holding volume and the tank's full holding volume at the level of outlet port 52.

Normally, in preferred operation of the system of FIG. 1, valve 62 is controlled to reduce the level of liquid being treated in tank 12, whenever possible, to the minimum holding volume of the tank. This typically will involve taking advantage of periods of low liquid influx rates and/or periods during which the incoming liquid is at or near a suitable discharge control limit. With the level of liquid in reactor tank 12 at the minimum tank volume, that is, at the tank's minimum effective treatment volume level, or at any level below the tank's full holding volume at discharge outlet 52, a sudden increase in concentration and/or flow volume of liquid entering the tank can be handled in the normal manner and/or by increasing the effective residence time through an increase in the effective holding volume of the tank. In a normal manner, controller 30 in response to pH signal 23 will actuate reagent feed pump 36 or 40 to feed appropriate neutralization reagent to the tank. Where controller 30 determines, however, by means of control algorithms readily implemented by those skilled in the art in view of the present disclosure, that the pH of the discharge will exceed a preselected limit, given the known maximum reagent feed rate and the effective residence time of the liquid in the reactor tank, controller 30 may actuate valve 62 to reduce or stop discharge via port 63, thereby causing the effective holding volume of reactor tank 12 to be increased. As indicated above, this increase in the effective holding volume of reactor tank 12 is comparable to temporary reserve capacity of the system above its maximum steady state operating capacity. In this way the sudden increase in concentration or flow rate of the incoming liquid is handled by a single tank CSTR system. Preferably valve 62 can be closed, manually or automatically, to operate the system as a standard CSTR system in the event of system malfunction.

Alternative apparatus may be used for the variable residence time means 60 for controlling the effective holding volume of reactor tank 12. A pump may be used, for example, rather than the gravity discharge arrangement in the embodiment of FIG. 1 comprising mid-tank discharge port 63 and adjustment valve 62. A pump or pump intake port positioned lower in the tank than the full-time open discharge port 52 would be used in such alternative embodiment to reduce the effective holding volume of the reactor tank to a level below its full holding volume. In such pump arrangement, the pump motor preferably would be controlled by an actuation signal from controller 30, corresponding to valve control signal 68 discussed above in connection with the embodiment of FIG. 1. Such pump arrangement is particularly advantageous for applications wherein the reactor tank is positioned at or below the level of a gravity fed ultimate discharge point. Such pump can also be used in conjunction with automatic control valves. Other suitable arrangements in accordance with this invention for reserving a portion of the full holding volume of a reactor tank to be used as spare capacity in the event of a sudden change in liquid inflow rate, concentration or composition will be apparent to those skilled in this area of technology in view of the present disclosure.

Referring now to the CSTR treatment system illustrated in FIG. 2, components which are common to those of the embodiment of FIG. 1 are given the same reference numerals used in FIG. 1. The embodiment of FIG. 2, however, comprises additional components, including a baffle module 70 positioned downstream of reactor tank 12 and upstream of final discharge. Suitable baffle modules are commercially available and well-known to those skilled in this technology. They may be for either variable or pre-set baffled flow. Baffle module 70 operates in the usual way to provide eddys and backflows which tend to level out irregularities in the measurable properties of the discharge. Optionally, treated liquid may be recirculated by recirculation pump 72 from baffle module 70 back into reactor tank 12 via recirculation line 73 entering reactor tank 12 at recirculation inlet port 74. Recirculation pump 72 preferably is a variable speed pump, providing a variable rate of recirculation of treated liquid back to reactor tank 12. Optionally, inlet port 74 comprises check valve means to avoid outflow of liquid via line 73 to the baffle module. Recirculation pump 72 typically is controlled by a recirculation signal 71 from control means 30. Such recirculation may be particularly advantageous, for example, to use treated liquid which falls well within pre-set pH limits or other measurable properties to aid in treating a sudden influx of fresh liquid which is significantly outside the control limits. The pH or other measurable property of the discharge can be measured within the baffle module or, as in the case of the embodiment of FIG. 2, by a sensor located in discharge line 54 downstream of baffle module 70. Specifically, sensor 56, as in the embodiment of FIG. 1, is located in discharge line 54 and generates discharge pH signal 58 to controller 30. Additional sensor 74 in discharge line 54 measures the discharge flow rate and generates corresponding discharge flow signal 75 to controller 30. Also in the embodiment of FIG. 2, the mixer 20 is controlled by mixer actuation signal 21 from controller 30.

The treatment systems of the invention optionally further comprise one or more detention tanks to hold selected volumes of untreated or insufficiently treated liquid during periods of high loading, that is, e.g., during periods of high liquid in-flow. In the embodiment of FIG. 2, dedicated detention tank 76 is seen to be connected to reactor tank 12 via detention line 78. Optionally, detention line 78 is selectively opened via valve or pump means controlled by control means 30. The sequestered portions of liquid are re-introduced via detention pump 80 in response to detention control signal 82 from control means 30. Typically, sequestered liquid is sent to reactor tank 12 during periods of reduced loading, that is, when the volume of liquid in reactor tank 12 is at or moving toward its minimum holding volume.

In accordance with certain preferred embodiments of the present CSTR treatment system, sensors are exposed to the liquid entering reactor tank 12 via inlet line 16. In the embodiment of FIG. 2, sensor 84 continuously measures pH of the inflowing liquid and generates corresponding inlet pH signal 85 to the control means 30. Inlet flow volume sensor 86 continuously measures the volumetric flow of liquid entering reactor tank 12 and generates corresponding inlet flow volume signal 87 to control means 30. Control means 30 is responsive to these input signals for control of the treatment process, for recording system operation, or both.

Those skilled in this area of technology will recognize the present CSTR treatment system represents significant technological advance. Its ability to react to changing inlet conditions enables it to be considerably more flexible than traditional systems in handling variable and unpredictable flows of aqueous waste effluent or other liquid. The system can be designed to revert to a fail-safe configuration, and includes a full-time open discharge outlet. Those who are skilled in this area of technology, given the present disclosure, will recognize that numerous variations and modifications can be made to the particular preferred embodiments discussed in detail above. The appended claims are intended to cover the true scope and spirit of the present invention, including all such modifications and variations.

We claim:

1. A variable residence time treatment system for receiving, treating and discharging a variable flow of liquid, comprising, in combination:

a) containment means having a variable effective holding volume for treatment of a liquid and comprising inlet means for admitting the liquid and at least one treatment material to adjust a measurable property of the liquid, mixing means for mixing said liquid with said at least one treatment material within the containment means, and discharge means for passing a discharge flow of treated liquid from the containment means, wherein the discharge means comprises a discharge outlet open full-time during operation of the system to pass, as needed, a portion of the discharge flow of treated liquid from the containment means at its full holding volume, and variable residence time means for controlling the effective holding volume of the containment means in response to a holding volume control signal by selectively passing a portion of the discharge flow of treated liquid from the containment means at less than its full holding volume;

b) sensor means for monitoring at least one measurable property of the liquid and for generating a corresponding first signal; and c) control means operatively connected to the sensor means, and to the variable residence time means for generating the holding volume control signal in response to the first signal.

2. The variable residence time treatment system of claim 1 wherein the containment means comprises a reactor vessel having a first inlet for admitting the liquid, a second inlet for admitting a first treatment material and a third inlet for admitting a second treatment material into the reactor tank.

3. The variable residence time treatment system of claim 2 further comprising treatment material feed means for metering separately the first treatment material to the second inlet in response to a first feed control signal from the control means, and the second treatment material to the third inlet in response to a second feed control signal from the control means.

4. The variable residence time treatment system of claim 1 wherein the sensor means comprises an inlet pH sensor for monitoring the pH of liquid entering the containment means and an inlet flow sensor for measuring the volume of liquid entering the containment means.

5. The variable residence time treatment system of claim 1 wherein the containment means comprises a reactor tank and the variable residence time means for controlling the effective holding volume comprises a second discharge outlet which is selectively openable by valve means responsive to said holding volume control signal, the second discharge outlet being located lower than the full-time open discharge outlet.

6. The variable residence time treatment system of claim 1 wherein the variable residence time means for controlling the effective holding volume comprises pump means selectively actuatable by the holding volume control signal to pump liquid from the containment means.

7. The variable residence time treatment system of claim 1 wherein the control means comprises a proportional, integral and derivative controller which generates a treatment material feed control signal for regulating a feeding of treatment material to the containment means.

8. The variable residence time treatment system of claim 1 further comprising detention tank means for temporarily holding quantities of liquid for subsequent treatment in the containment means.

9. The variable residence time treatment system of claim 1 further comprising means for recycling treated discharge back into the containment means.

10. The variable residence time treatment system of claim 1 further comprising a baffle module for receiving the discharge flow of treated liquid from the containment means prior to final discharge.

11. A variable residence time treatment system for receiving, treating and discharging a variable flow of liquid, comprising, in combination:

a) containment means having a variable effective holding volume for treatment of a liquid and comprising
inlet means for admitting the liquid and a treatment material to adjust a measurable property of the liquid,
mixing means for mixing said liquid with said treatment material within the containment means, and
discharge means for passing a discharge flow of treated liquid from the containment means, wherein the discharge means comprises a discharge outlet open full-time during operation of the system to pass, as needed, a portion of the discharge flow of treated liquid from the containment means at its full holding volume, and variable residence time means for controlling the effective holding volume of the containment means in response to a holding volume control signal by selectively passing a portion of the discharge flow of treated liquid from the containment means at less than its full holding volume;

b) sensor means for monitoring a measurable property of the liquid and for generating a corresponding first signal, comprising an inlet pH sensor for monitoring the pH of liquid entering the containment means and an inlet flow sensor for measuring the volume of liquid entering the containment means; and c) control means operatively connected to the sensor means, and to the variable residence time means for generating the holding volume control signal in response to the first signal; and d) containment sensor means for monitoring the pH of liquid being treated within the containment means and for generating a corresponding containment pH signal to the control means, containment level sensor means for measuring the amount of liquid being treated within the containment means and for generating a corresponding containment level signal to the control means, discharge pH sensor means for continuously measuring the pH of treated liquid discharged from the treatment system and for generating a corresponding discharge pH signal to the control means, and discharge flow sensor means for measuring a volume of discharge flow from the treatment system and for generating a corresponding discharge flow signal to the control means, and wherein the holding volume control signal is generated by the control means at least in part in response to said first signal, said containment level signal said discharge pH and signal and said discharge flow signal.

12. A variable residence time treatment system for receiving, treating and discharging a variable flow of liquid, comprising, in combination:

a) containment means having a variable effective holding volume for treatment of a liquid and comprising
inlet means for admitting the liquid and a treatment material to adjust a measurable property of the liquid,
mixing means for mixing said liquid with said treatment material within the containment means, and
discharge means for passing a discharge flow of treated liquid from the containment means, wherein the discharge means comprises a discharge outlet open full-time during operation of the system to pass, as needed, a portion of the discharge flow a portion of from the containment means at its full holding volume, and variable residence time means for controlling the effective holding volume of the containment means in response to a holding volume control signal by selectively passing the discharge flow of treated liquid from the containment means at less than its full holding volume;

b) sensor means for monitoring a measurable property of the liquid and for generating a corresponding first signal;

c) control means operatively connected to the sensor means, and to the variable residence time means for generating the holding volume control signal in response to the first signal;

d) a baffle module for receiving the discharge flow; and e) recirculation means for passing treated liquid from the baffle module back into the containment means.

13. A variable residence time treatment system for receiving, treating and discharging a variable flow of aqueous waste effluent, comprising, in combination:

a) containment means having a variable effective holding volume for treatment of an aqueous waste effluent and comprising inlet means for admitting the aqueous waste effluent and a treatment material to adjust a measurable property of the aqueous waste effluent, mixing means for mixing said effluent and said treatment material within the containment means, and discharge means for passing a discharge flow of treated aqueous waste effluent from the containment means, wherein the discharge means comprises a discharge outlet open full-time during operation of the system to pass, as needed, a portion of the discharge flow to treated effluent from the containment means at its full holding volume, and variable residence time means for controlling the effective holding volume of the containment means in response to a holding volume control signal by selectively passing a portion of the discharge flow of treated effluent from the containment means at less than its full holding volume;

b) sensor means for monitoring a measurable property of the effluent and for generating a corresponding first signal; and c) control means operatively connected to the sensor means, and to the variable residence time means for generating the holding volume control signal in response to the first signal.

* * * * *